United States Patent
Hashimoto et al.

(10) Patent No.: US 6,902,114 B2
(45) Date of Patent: Jun. 7, 2005

(54) SETTING BAR CODE OF OPTICAL INFORMATION READER, METHOD FOR GENERATING THE SAME, METHOD FOR CHANGING SETTING OF OPTICAL INFORMATION READER AND COMPUTER-READABLE MEDIUM

(75) Inventors: Hideki Hashimoto, Osaka (JP); Shintaro Uchida, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 10/151,555

(22) Filed: May 20, 2002

(65) Prior Publication Data

US 2002/0185540 A1 Dec. 12, 2002

(30) Foreign Application Priority Data

Jun. 7, 2001 (JP) .................................... P.2001-173273

(51) Int. Cl.[7] .............................................. G02B 26/10
(52) U.S. Cl. ............................ 235/462.25; 235/462.15; 235/494
(58) Field of Search ....................... 235/462.25, 462.15, 235/462.01, 383, 487, 472.01, 494; 347/16; 283/74

(56) References Cited

U.S. PATENT DOCUMENTS

| | | | | | |
|---|---|---|---|---|---|
| 4,641,347 A | * | 2/1987 | Clark et al. | ................... | 705/62 |
| 4,825,058 A | * | 4/1989 | Poland | ................... | 235/462.01 |
| 5,075,862 A | * | 12/1991 | Doeberl et al. | ............ | 358/1.18 |
| 5,120,943 A | * | 6/1992 | Benz | .......................... | 235/375 |
| 5,159,635 A | * | 10/1992 | Wang | .......................... | 380/51 |
| 5,395,173 A | * | 3/1995 | Ueno et al. | .................. | 400/103 |
| 5,479,588 A | * | 12/1995 | Sawada et al. | ............ | 358/1.18 |
| 5,584,008 A | * | 12/1996 | Shimada et al. | ............ | 711/114 |
| 5,635,698 A | * | 6/1997 | Terada | .................... | 235/462.01 |
| 5,706,281 A | * | 1/1998 | Hashimoto et al. | ......... | 370/252 |
| 5,837,986 A | * | 11/1998 | Barile et al. | ............ | 235/462.01 |
| 5,939,700 A | * | 8/1999 | Ackley | .................... | 235/462.01 |
| 6,047,373 A | * | 4/2000 | Hall et al. | ...................... | 713/1 |
| 6,279,828 B1 | * | 8/2001 | Fann | ...................... | 235/462.01 |
| 6,293,467 B1 | * | 9/2001 | Reddersen et al. | .... | 235/462.15 |
| 6,331,898 B1 | * | 12/2001 | Yokoi et al. | .................. | 358/1.9 |
| 6,488,207 B1 | * | 12/2002 | Kawai et al. | ............... | 235/383 |
| 6,505,778 B1 | * | 1/2003 | Reddersen et al. | .... | 235/462.25 |
| 6,519,632 B1 | * | 2/2003 | Brackett et al. | ............ | 709/219 |

FOREIGN PATENT DOCUMENTS

JP       2000-076375       3/2000       ...................... 7/10

* cited by examiner

*Primary Examiner*—Diane I. Lee
*Assistant Examiner*—Kumiko C. Koyama
(74) *Attorney, Agent, or Firm*—Kilyk & Bowersox, P.L.L.C.

(57) ABSTRACT

To generate a setting bar code for changing setting of an optical information reader, in setup items changed by the user, each item different from the default value is extracted and bar code original data is created. Further, if the amount of information to be encoded is large and the length of a setting bar code exceeds a predetermined value, the information to be encoded is divided into a plurality of parts as a plurality of setting bar codes so that each of the plurality of setting bar codes falls within the predetermined value. Each of the plurality of setting bar codes contains information concerning the total number of bar codes and the serial number relative to the total number of bar codes and check information indicating that the plurality of setting bar codes belong to the same setup contents.

27 Claims, 8 Drawing Sheets

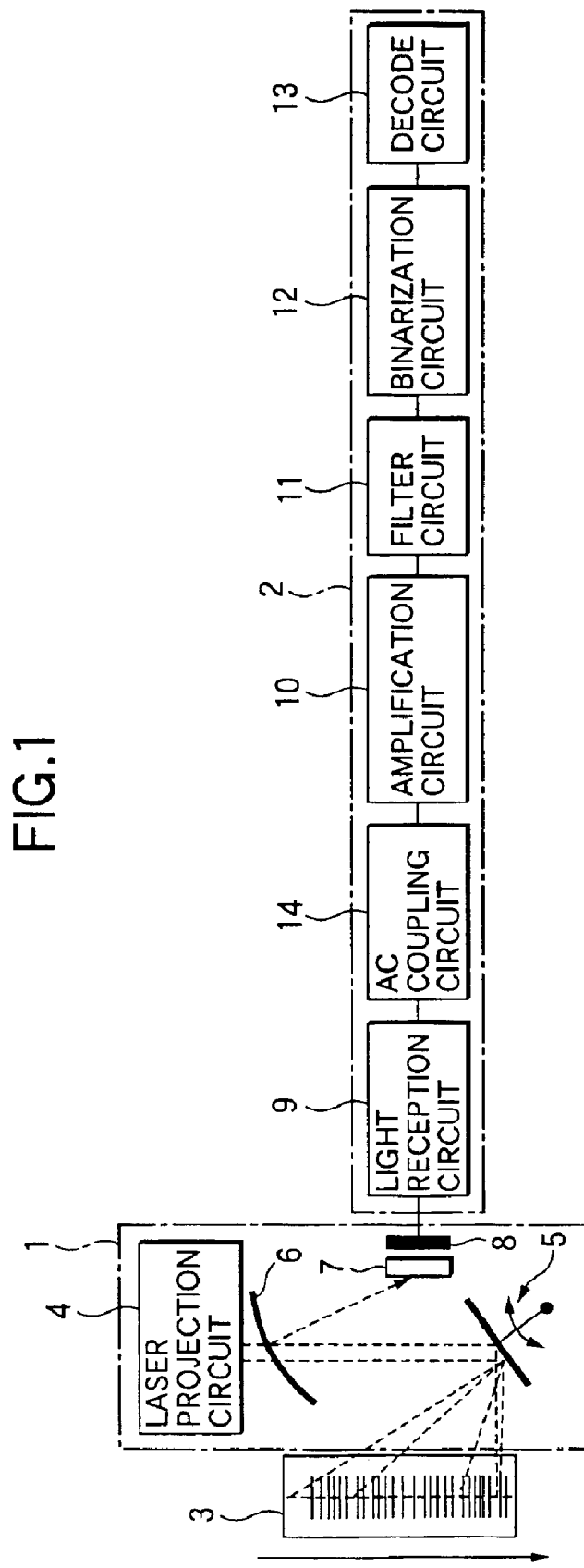

FIG.2

SETTING

| FILE(F) | TERMINAL(T) | PORT SETTING(P) | VERSION(V) |

| BAR CODE SETTING | FUNCTION SETTING | COMMON SETTING | COMMUNICATION SETTING | BATCH SETTING BAR CODE |

READ CODE TYPE

- ☑ JAN/EAN/UPC — DETAIL
- ☑ CODE128(EAN128) — DETAIL
- ☑ CODE39 — DETAIL
- ☑ NW-7(CODA BAR) — DETAIL
- ☑ CODE93 — DETAIL
- ☑ ITF — DETAIL
- ☑ INDUSTRIAL2 OF 5 — DETAIL
- ☑ COOP2 OF 5 — DETAIL

JAN/EAN/UPC SETTING

- ☑ JAN13 READ
- ☑ JAN8 READ
- ☑ UPC-E READ

UPC-A SETTING
- ◉ 13 CHARACTER TRANSMISSION
- ○ 12 CHARACTER TRANSMISSION

UPC-E SETTING
- ○ SYSTEM CODE "0" OMISSION
- ◉ SYSTEM CODE "0" ADDITION

☐ LIMITED OUTPUT    LIMITED OUTPUT SETTING

MODEL SELECT | TRANSMIT | RECEIVE

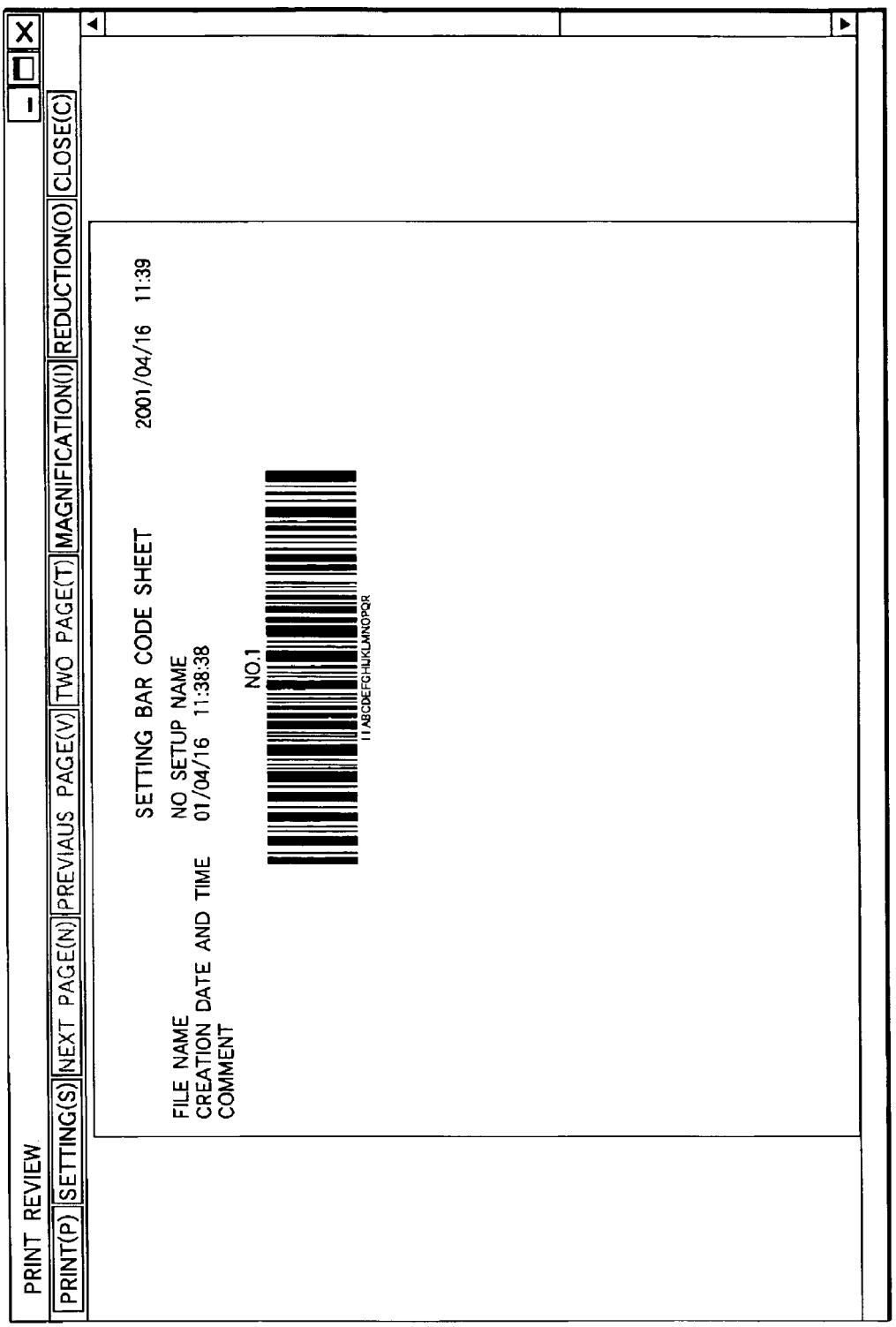

CONTENT

| 1(TOTAL BAR CODE NUMBER) |
| 1(SERIAL NUMBER) |
| START ID |
| SETTING ITEM ID |
| PARAMETER |
| SETTING ITEM ID |
| PARAMETER |
| SETTING ITEM ID |
| PARAMETER |
| ---------------- |
| ---------------- |
|  |
|  |
|  |
|  |
| END ID |
| CHECK CODE |

FIG.7
| CONTENT | 2(TOTAL BAR CODE NUMBER) | 1(SERIAL NUMBER) | START ID | SETTING ITEM ID | PARAMETER | SETTING ITEM ID | PARAMETER | ----- | ----- | | | | CHECK CODE |
| CONTENT | 2(TOTAL BAR CODE NUMBER) | 2(SERIAL NUMBER) | SETTING ITEM ID | PARAMETER | SETTING ITEM ID | PARAMETER | SETTING ITEM ID | PARAMETER | ----- | ----- | | END ID | CHECK CODE |

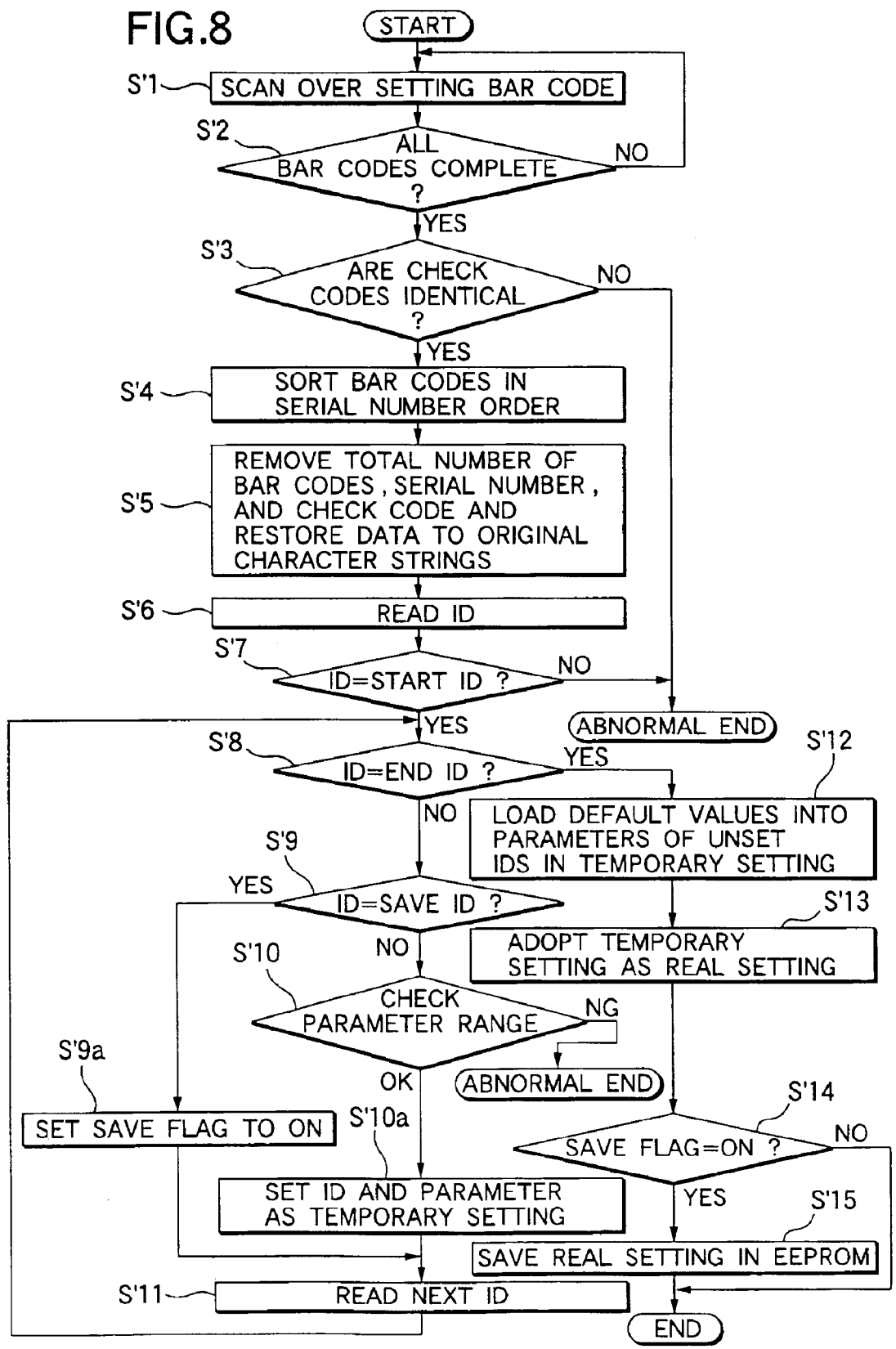

SETTING BAR CODE OF OPTICAL INFORMATION READER, METHOD FOR GENERATING THE SAME, METHOD FOR CHANGING SETTING OF OPTICAL INFORMATION READER AND COMPUTER-READABLE MEDIUM

BACKGROUND OF THE INVENTION

1. Field of the Invention

This invention relates to a setting bar code of an optical information reader, a method for generating the setting bar code, a method for changing setting of an optical information reader, and a computer-readable medium including a program for generating the setting bar code. It relates more particularly to a setting bar code to be read into an optical information reader, which reads a coded optical pattern of a one-dimensional bar code, a two-dimensional code, etc., in order to change various settings of the optical information reader, a method for generating the setting bar code, a method for changing the setting of an optical information reader, and a computer-readable medium including a program for generating the setting bar code.

2. Description of the Related Art

Nowadays, a bar code is used in application of identify a commodity code, etc. The bar code comprises contiguous lines different in width so that it can represent alphanumerics by bar and blank portions. The bar code, for example, represents a universal product code.

The codes of optical patterns include one-dimensional bar codes and two-dimensional codes (data symbols). The one-dimensional bar codes involve different types of bar codes such as CODE39, ITF, industrial 2of5, NW-7, and CODE128 including JAN (EAN) code usually put on commodities, etc. UPC-A and UPC-E used centering on USA are also available.

On the other hand, the two-dimensional codes are roughly classified into stack type and matrix type. The stack type is a form wherein one-dimensional bar codes are stacked on each other. The stack type normally does not provide information in the vertical direction. The matrix type is a polygon (generally, a square) and is formed like a mosaic comprising a matrix of monochrome cells for providing information. The matrix type provides information in the horizontal direction and the vertical direction. The stack type includes PDF417, CODE49, etc. The matrix type includes QR code, data code, verification code, CP code, etc.

To read such an optical pattern, an optical information reader is used. For example, a bar code scanning device for scanning a bar code generally as optical information reader is called a bar code reader, a bar code scanner, etc.

The bar code scanning device generally comprises a configuration as shown in FIG. 1. The bar code scanning device shown in FIG. 1 comprises a bar code read section 1 and a signal processing circuit 2. The bar code scanning device scans a bar code label 3 with a bar code printed through the bar code read section 1, detects reflected light, and reads information of the bar code by the signal processing circuit 2.

In FIG. 1, a laser projection circuit 4 projects light such as laser light to a galvanometer mirror 5 and reflected light on the galvanometer mirror 5 is scanned over the bar code. The bar and blank (monochrome) portions making up the bar code differ in reflectivity. The blank portion provides a large reflected light amount. The bar portion provides a small reflected light amount. The reflected lights are gathered on a light gathering mirror 6 through the galvanometer mirror 5. The gathered reflected lights are taken out as an analog signal in time series through a band-pass filter 7 and a photodiode serving as a light reception element 8. The analog signal is sent to the signal processing circuit 2.

The signal processing circuit 2 has a light reception circuit 9, an AC coupling circuit 14, an amplification circuit 10, a filter circuit 11, a binarization circuit 12, and a decode circuit 13. The light reception circuit 9 receives a signal from the bar code read section 1. The AC coupling circuit 14 allows the AC component of output of the light reception circuit 9 to pass through. The amplification circuit 10 amplifies the output signal of the AC component provided by the AC coupling circuit 14. The filter circuit 11 filters the amplified signal. The binarization circuit 12 binaries the filtered signal. The decode circuit 13 decodes the information recorded on the bar code. The decode circuit 13 generally is implemented as a CPU, etc. The digital signal binarized by the binarization circuit 12 is sent to the CPU, which then decodes the signal by a program according to an algorism.

To change the setup items of the bar code reader, various methods are available. For example, the bar code reader is connected to a computer through a serial interface capable of conducting two-way communications such as RS-232C for placing them in a state in which data communications can be conducted, and the setup items of the bar code reader can be changed by software in the computer. However, this method has disadvantages in that the bar code reader needs to be provided with a communication port and that bar code reader setting software needs to be previously built in the computer. Thus, generally a method of providing a dedicated setting bar code and causing the bar code reader to scan the dedicated setting bar code, thereby changing the setting of the bar code reader is used. This method has the advantage that connection to an external machine such as a computer is not required and the apparatus is simple because the setup items are read simply by scanning over the dedicated setting bar code like a normal bar code label.

However, the method of reading the setting bar code and setting the bar code reader has disadvantages in that the bar code must be scanned for each setup item and the number of scan times is increased, leading to intricate work. The setup items involve a large number of parameters which must be specified such as the type of bar code to be read by the bar code reader, the operation mode, and the trigger switch operation attribute. Each of the setup items is set by reading a specific bar code determined for each setup item. Therefore, one or more bar codes need to be read for one setting.

Hitherto, the setting bar code has been attached to a manual of the bar code reader. At each time of setting change, the user has found out the corresponding bar code while turning the pages of the manual and has scanned over a plurality of setting bar codes for changing the setting. For example, to change the setup items for one operation mode, first the setting bar code to specify the operation mode to be changed needs to be found and scanned and further the changing bar code of the specific item to be changed needs to be found out and scanned. Since the work is repeated, if a large number of setup items exist, the number of scan times is increased and the work becomes intricate accordingly and the risk of erroneous specification and a read error is also increased.

A method of specifying any desired setting bar code by the user and printing the bar code is developed (for example, Japanese Patent Unexamined Publication No. 2000-76375). In this method, the setting bar codes frequently used by the user are previously printed, whereby ease of use can be improved. However, also in the method, if a large number of setup items exist, a large number of setting bar codes need to be printed accordingly and to be all scanned at each time of setting change. Thus, the need for the effort of repeating scan is not eliminated. If a plurality of setting groups exist and are used alternately, as many bar codes as the number of setup items are scanned at each time of setting change. Thus, extreme labor and time are taken and in addition, the risk of mistaking one setting bar code for another is also involved.

SUMMARY OF THE INVENTION

The invention has been developed to solve the problems. It is an object of the invention to provide a setting bar code of an optical information reader, a method for generating the setting bar code, a method for changing the setting of an optical information reader, and a computer-readable medium including a program for generating the setting bar code, which it is possible to reduce the load on the user changing setting of an optical information reader, generate a setting bar code containing a plurality of setup items, decrease the number of scan times at the setting change time, simplify and speed up the setting change, and prevent a setting change mistake.

In order to accomplish the object above, the following means are adopted. According to the invention, there is provided a setting bar code of an optical information reader which is scanned by the optical information reader so that desired setup items concerning operation of the optical information reader can be changed, the setting bar code comprising: information a setup item having a setup value different from a corresponding initial value in setup items to be changed. Accordingly, the amount of information not be encoded can be decreased.

The setting bar code preferably comprises read start information; read end information; identification information indicating the setup item having the setup value different from the corresponding initial value; and parameter information indicating a setup content for the setup item having the setup value different from the corresponding initial value.

In the setting bar code, it is preferable that the setting bar code includes a plurality of bar code parts to which the information a setup item having a setup value different from a corresponding initial value are divided so that a length of each of bar code parts becomes equal or less than a predetermined length.

Preferably, each of the plurality of bar code parts may contain information concerning the total number of bar code parts and the serial number relative to the total number of bar code parts.

Further, in the setting bar code, it is also preferable that each of the plurality of setting bar code parts contains check information indicating that the plurality of setting bar code parts belong to a same setup content.

To achieve the object of the present invention, there is also provided a method for generating a setting bar code which is scanned by an optical information reader so that desired setup items concerning operation of the optical information reader can be changed, the method comprising: specifying a change content for each setup item to be changed; extracting information a setup item having a setup value different from a corresponding initial value in setup items to be changed and generating a bar code original data; adding read start information and read end information to the bar code original data; and outputting a setting bar code based on the bar code original data.

The above-mentioned setting bar code generation method, preferably, further comprises dividing the bar code original data into a plurality of data parts as a plurality of bar code parts so that a length of each of the plurality of bar code parts becomes equal or less than a predetermined length, if a length of the setting bar code generated based on the bar code original data exceeds the predetermined value.

Preferably, the setting bar code generation method may further comprise adding information concerning the total number of bar code parts and the serial number relative to the total number of bar code parts to each of the plurality of data parts into which the bar code original data is divided.

In the setting bar code generation method, it is preferable that it further comprises adding check information indicating that the plurality of data parts into which the bar code original data is divided belong to a same bar code original data to each of the plurality of data parts.

The above-mentioned object of the present invention can be also achieved by a method for changing setting of an optical information reader using a setting bar code of the optical information reader which is scanned by an optical information reader so that desired setup items concerning operation of the optical information reader can be changed, the method comprising: specifying a change content for each setup item to be changed; extracting information a setup item having a setup value different from a corresponding initial value in setup items to be changed and generating a bar code original data; adding read start information and read end information to the bar code original data; generating a setting bar code based on the bar code original data; scanning the setting bar code for reading information; reconstructing the read information and changing each specified setup item with the setup value; and loading the initial values into the setup items which are not specified.

Further, The object of the present invention can be achieved by a computer-readable medium including a program executable on a computer for generating a setting bar code for an optical information reader which is scanned by an optical information reader so that desired setup items concerning operation of the optical information reader can be changed, the program comprising instructions having: a first function of specifying setup items to be changed, each including a setup value different from a corresponding initial value and specifying a change content for each setup item to be changed; a second function of determining whether or not a length of a data for each setup item specified by the first function exceeds a predetermined length; a third function of dividing the data for the setup item into a plurality of data pieces so that a length of each of the plurality of data pieces becomes equal to or less than the predetermined length, if the second function determines that the data length of the setup item exceeds the predetermined length; and a fourth function of generating the setting bar code including a plurality of bar code parts based on the plurality of data pieces.

The program can be not only recorded on a computer-readable medium, but also downloaded through a network.

In the above-mentioned computer-readable medium, it is preferable that program further comprises instructions having: a fifth function of providing the number of divisions and division order data to the plurality of data pieces.

Further, in the computer-readable medium, it is preferable that the fifth function further includes instructions to add check data indicating that the plurality of data pieces into which the setup item data is divided belong to a same setup item data to each of the plurality of data pieces. Further, in order to accomplish the object above according to the present invention, there is provided computer-readable medium including a program executable on a computer for generating a setting bar code defining a predetermined operation of an optical information reader, the program comprising instructions having: a first function of displaying each operation item of the predetermined operation and making a user determine an attribute of each operation item; and a second function of generating the setting bar code for only an operation item with the set attribute different from a default value.

BRIEF DESCRIPTION OF THE DRAWINGS

FIG. 1 is a block diagram to show the configuration of a bar code scanning device;

FIG. 2 is an image drawing to show a set screen of a setting bar code generation program according to an embodiment of the invention;

FIG. 3 is an image drawing to show the stat of displaying a print image of a setting bar code using the program in FIG. 2;

FIG. 7 is a schematic drawing to show an example wherein the setting bar code is made up of a plurality of bar codes; and FIG. 8 is a flowchart to show a procedure of scanning over and decoding setting bar codes.

DETAILED DESCRIPTION OF THE INVENTION

Figure 4:
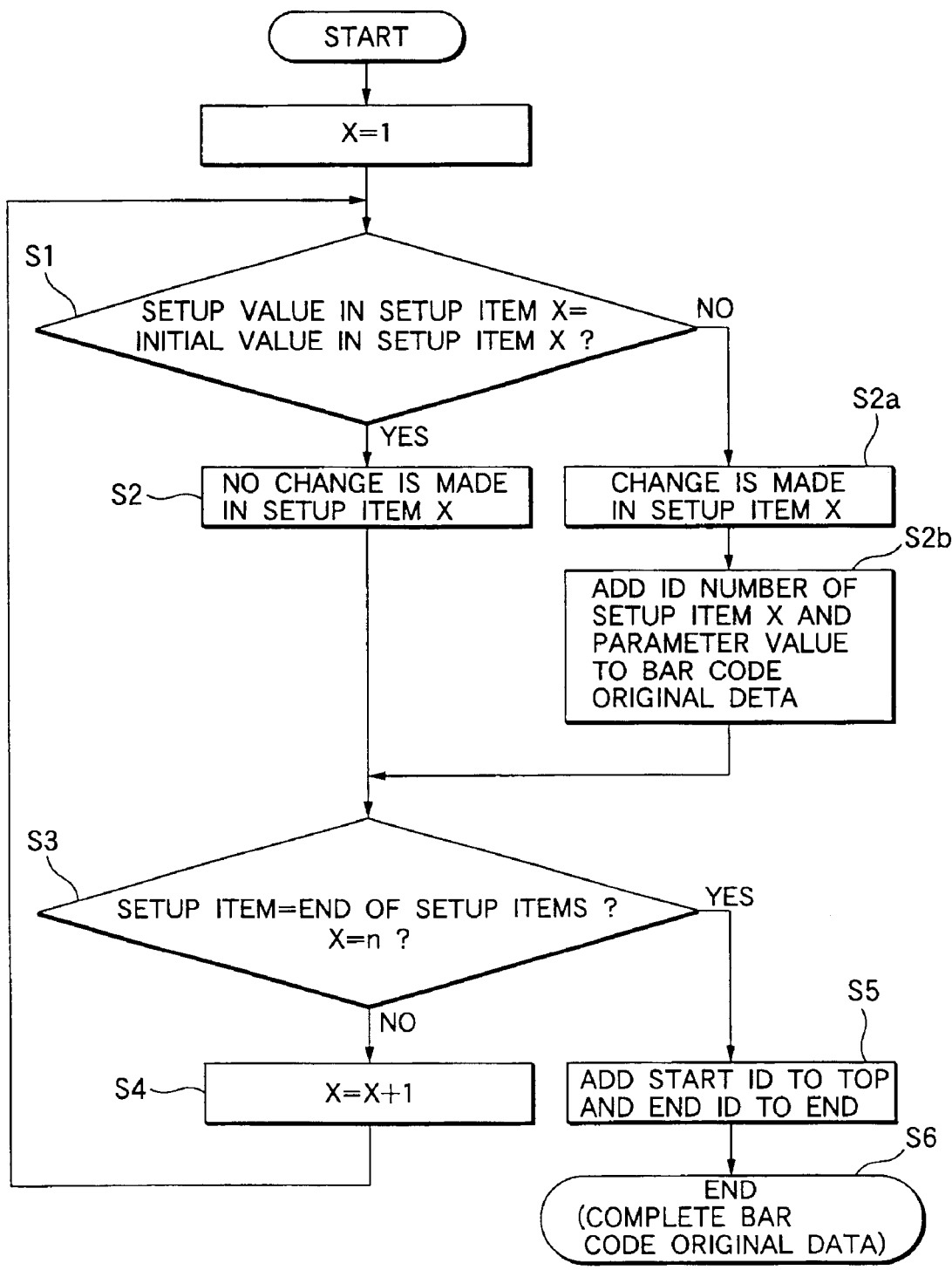
FIG. 4 is a flowchart to show the process of encoding into the setting bar code based on bar code original data.

Referring now to the accompanying drawings, there are shown preferred embodiments of the invention. However, the embodiments described later exemplify optical information readers for embodying the technical thought of the invention and the invention is not limited to the optical information readers described later. The members as defined in claims are not limited to the members of the embodiments. The size of each member, the positional relationship, and the like shown on the accompanying drawings may be exaggerated for purposes of illustration.

In the following embodiments, an example of applying to a bar code scanning device will be discussed as an example of embodying an optical information reader of the invention. However, the embodiments of the invention are not limited to bar code scanning devices. For example, the embodiments can also be used for an OCR (Optical Character Reader), etc., for recognizing two-dimensional code and text. The term "bar code" in this specification is used to mean not only a one-dimensional bar code, but also a two-dimensional code (data symbol).

The bar code generally comprises an alternating pattern of bars of black, etc., low in reflectivity and blank portions of white, etc., with no print high in reflectivity for recording any desired information consisting of alphanumerics, etc. The bar code is used in a mode in which a bar code label 3 comprising the bar code printed on a seal, etc., is put on the object or in a mode in which the bar code is printed directly on the object. A light beam of laser light, etc., is scanned over the bar code and reflected light is detected by a light reception element of a light reception section, whereby the bar and space widths of the bar code are measured. The provided analog signal is decoded, whereby the information encoded in the bar code is read.

In the following embodiments, the setting bar code is generated by software that can be installed in a computer such as a personal computer for execution. The software is distributed with a recording medium such as a flexible disk, a CD-ROM, or a DVD-ROM or in a mode in which the software is downloaded through a network from a server storing the software on the network.

The invention is not limited to the method of generating the setting bar code by software that can be installed. For example, the setting bar code can also be prepared by software built in hardware, rewritable or rewrite-impossible firmware, or hardware.

The software of the embodiment makes it possible to connect a bar code reader to a computer through an RS-232C interface for conducting data communications. The method of changing setting by data communications from the computer can change the setting more speedily than a method of scanning over each setting bar code because each setup item can be directly specified and changed.

Although the method is easy, the setup item cannot be specified if a connection port to the computer does not exist; this is a problem of the method. Particularly, the bar code reader is used as the input means of the user, often a keyboard is not connected and the user cannot manually enter setting in the computer. In contrast, the method of scanning over the setting bar code generated according to the invention does not depend on hardware of such a connection port, etc., and enables easy setting change independently of the model of the bar code reader.

A procedure of generating the setting bar code will be discussed. FIG. 2 shows the screen image of software. The user specifies any desired setup items from such a GUI. In the figure, the type of bar code to be read is specified. In addition, the setup items include specification of the number of characters of the bar code to be read, setting the operation mode of the bar code reader, specific function assignment to a switch, etc.

In the embodiment, the contents previously set by the user are stored in the computer or software and when the screen is opened, automatically the previous setting is displayed. Therefore, the user changes the setting of only the part to be changed from the previous setting. Whenever the setting change screen is opened, the preset values or the factory-shipped default values may be loaded into the setup items on the software screen. Further, the user can also give names to separate setting groups for storage and call the setting group as required.

Upon completion of specifying all setup items, the process proceeds to a setting bar code print screen. The user can check the printed bar code image by a print preview function. FIG. 3 shows an example of the print image. The file name of the computer file storing the setup information of the setting bar code, the creation date, and a comment can be added to the setting bar code together with the header of setting bar code sheet for printing the setting bar code.

[ID (Identification) Number and Parameter]

Figure 6:
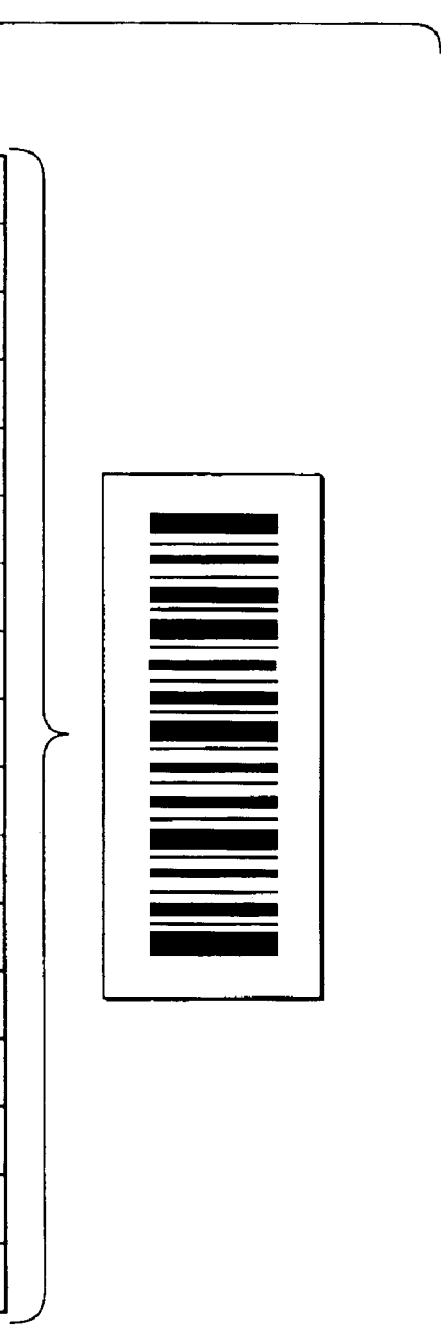
FIG. 6 is a schematic drawing to show an example wherein the setting bar code is implemented as one bar code.

A unique ID number is previously assigned to each setup item of the bar code reader. A specific value that can be set for each setup item is related to the ID number as a parameter. For example, the ID number is followed by the parameter value corresponding to the ID number, followed by another ID number, followed by the parameter of this ID number, . . . (as shown in FIG. 6) To distinguish the ID number and the parameter corresponding thereto from each other, for example, the numbers of characters of the ID number and the parameter are fixed to predetermined values.

In the embodiment, if the setup value of each setup item, namely, the parameter is the same as the default value, it is not added to a bar code original data. The information of the ID number and the parameter is added only to the setup item whose parameter differs from the default value. Automatically, the default value is loaded into the setup item having the ID number not specified in the setting bar code. Thus, the ID number representing each setup item and the parameter representing the setup value in the setup item are paired and the information is added only to the setup item whose setup value (parameter) is to be changed from the default value. Therefore, the information amount concerning the setting change can be lessened and the encoded bar code can be shortened.

Special ID numbers having no parameter are start ID, end ID, and save ID. The start ID and the end ID are placed at the top and the end of the setting bar code for indicating the read start position and the read end position. The save ID is provided for setting a save flag for determining whether or not the setup contents of each setup item are to be saved in nonvolatile memory.

The bar code reader comprises volatile memory and nonvolatile memory as storage section for saving the contents set in each setup item. The volatile memory is implemented as RAM, etc., and the contents of the memory are lost if the power of the bar code reader main unit is turned off. On the other hand, the nonvolatile memory is implemented as ROM, etc., and retains the contents if the power is turned off. Generally, the volatile memory is accessed at high speed and the nonvolatile memory is accessed at low speed. Therefore, the setup contents are read into the volatile memory, whereby high-speed access is made possible. However, if the setup contents remain in the volatile memory, they need to be again set each time the power is turned off. Then, the setup contents are retained in the nonvolatile memory. The setup contents are written into the nonvolatile memory, whereby when the bar code reader is started, the contents of the nonvolatile memory are copied into the volatile memory and it is made possible to read and write the setup contents at high speed.

In this case, if the save flag is set to ON in the save ID, when setting is changed, the setup contents are also written into the nonvolatile memory for update at the same time as they are written into the volatile memory. Accordingly, when the power of the bar code reader is then turned on, the updated setup contents in the nonvolatile memory are copied into the volatile memory. In contrast, if the save ID is not added to the setting bar code, the setup contents only in the volatile memory are updated and the contents of the nonvolatile memory are not updated. Thus, if the setting bar code with the save ID not set is scanned, the setup contents are not saved and are applied only once and after the power is turned off, the setup contents are restored to the former setting. The save flag is set to ON in the presence of the save ID for writing the setup contents into the nonvolatile memory. However, when the save ID exists, the save flag may be set to OFF, or ON or OFF of the save flag may be specified in the save ID. Thus, the save ID enables the user to specify whether the setup contents are to be saved or temporarily changed.

[Encode Method]

The process of encoding the contents set as described above into the bar code by software will be discussed with reference to FIG. 4.

The bar code reader has factory-shipped default values set as initial values. The default values are stored in a memory table, etc., implemented as EEPROM contained in the bar code reader. The values which seem to be most general or frequently used are set as the default values (preset values).

At S (step) 1, each setup item is compared with the default value. All setup items are assigned numbers in order starting at X=1 and the number of the last setup item is n. First, with X=1, if the user-specified setup value in the corresponding setup item is the same as the default value in the setup item, the process proceeds to S2 and it is determined that no change is made in the setup item with X=1. If a different value from the default value is set, process jumps to S2a and it is determined that change is made in the setup item with X=1. The process proceeds to S2b and the ID number of the setup item with X=1 and the parameter value corresponding to the setup value are added to the bar code original data.

Then, the process proceeds to S3 and whether or not X reaches the total number of the setup items, n, is determined. If the end of the setup items is not reached, the process proceeds to S4 and one is added to X and the process returns to S1. The operation is repeated until X reaches n, whereby all setup items are determined. When all setup items are determined, the process jumps from S3 to S5. At S5, the start ID and the end ID are added to the top and the end of the bar code original data respectively. Then, the process proceeds to S6 and terminates. At this point in time, the bar code original data is complete and the setup items in which change is made are extracted and the ID numbers and the parameter values of the extracted setup items are all collected in the bar code original data.

[Dividing Bar Code]

Figure 5:
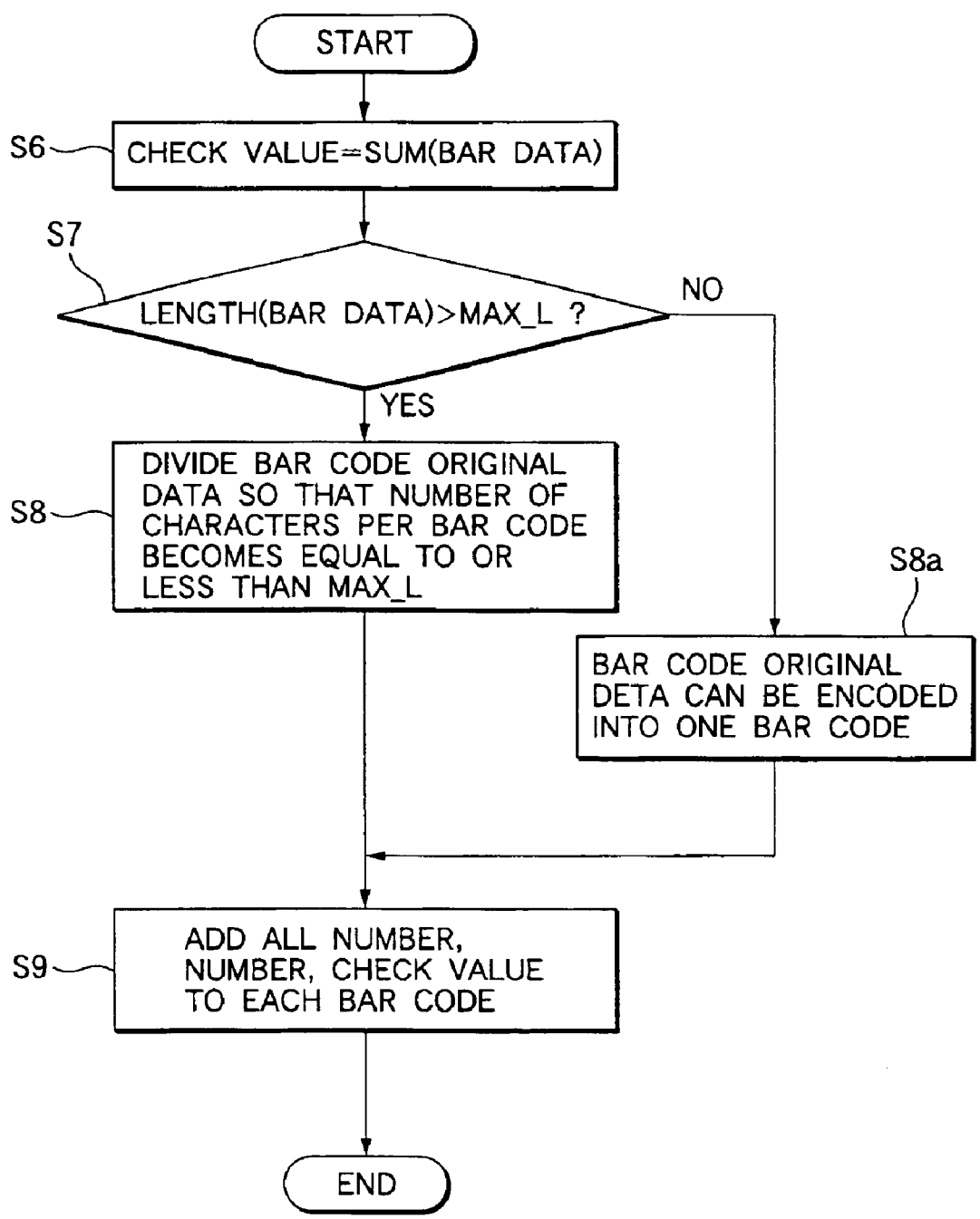
FIG. 5 is a flowchart to show a procedure of dividing the bar code original data into a plurality of setting bar codes.

A procedure of dividing the bar code original data thus provided into a plurality of bar codes as required will be discussed with reference to a flowchart of FIG. 5. In the flowchart of FIG. 5, CheckValue represents a check code, BarData represents the bar code original data, Length(n) represents the number of characters of a character string n, Sum (n) represents the addition result value of character codes of the character string n, Max_L represents the maximum number of characters per bar code, AllNumBar represents the total number of bar codes, and NumBar represents the serial number of the bar code in the total number.

The purpose of dividing the bar code (bar code original data) into a plurality of bar codes is to decrease occurrence of read errors. Since the bar code reader involves a proper scan width, a too long bar code cannot be read. At the scanning time, a distance is kept between the bar code reader and a bar code label, whereby a beam is scattered and thus the scan width widens, but the spot worsens, degrading the read accuracy. Therefore, to ensure precise read, the bar code (bar code original data) needs to be placed in a proper bar code length. Thus, if the number of data pieces to be encoded increases and the full length of the bar code lengthens and exceeds the maximum read range of the bar code reader, the bar code original data cannot be encoded into one bar code. Even if the length is within the maximum read range, if it is almost beyond the range, the possibility that a read error will occur becomes high. Thus, a slight margin is provided so as to improve the read accuracy and enhance the reliability of read. For the described reasons, the bar code (bar code original data) is divided into a plurality of bar codes so that each part of the bar code original data becomes equal to or less than the stipulated number of characters. The maximum number of characters per bar code, Max_L, is determined considering the maximum read range of the bar code reader and the margin. If the number of characters of the bar code original data provided is equal to or less than Max_L, the bar code original data can be encoded into one bar code.

First, at S6, the check code is calculated from the bar code original data provided according to the procedure previously described with reference to FIG. 4. The check code is a check value added for distinguishing a plurality of setting bar codes from each other. For this purpose, it is desirable that each check code should be assigned a proper value determined uniquely for each setting bar code. In the embodiment, the sum total resulting from adding the character codes of all character strings contained in the bar code original data, Sum (BarData), is adopted as the check code CheckValue. Alternatively, the characters of the bar code original data are converted into numeric values and the low-order digits of the sum total of the numeric values are used.

Next, the process proceeds to S7 and whether or not the total number of the characters of the character strings of the bar code original data, Length (BarData), is greater than the maximum number of characters per bar code, Max_L, is determined. If Length (BarData) is equal to or less than Max_L, the bar code original data can be encoded into one bar code, as described above and thus the process jumps to S9 (or the end) through S8a.

If Length (BarData) is greater than Max_L, the process jumps to S8 and the bar code original data is divided into a plurality of bar codes. Specifically, the bar code original data is divided so that the number of the characters of each of the bar codes in (into) which the bar code original data is encoded (divided) does not exceed the maximum number of characters per bar code, Max_L.

Last, at S9, necessary information is added to the provided bar codes. The total number of bar codes making up the setting group, AllNumber, and the serial number NumBar indicating the order of the bar code in the bar codes making up the setting group are added. Further, the check code CheckValue indicating that each of the divided bar codes belongs to the same setting group is added.

The data required for generating the bar code to be printed is now provided. When the software passes the data to a bar code print routine, print is executed. The user checks the bar code print image as required and gives a print instruction. When the print instruction is executed, the setting bar code is printed out on the printer connected to the computer in which the software is installed. The print image can be checked on the screen of the computer before print, as shown in FIG. 3. FIGS. 6 and 7 show the formats of the bar codes actually created.

FIG. 6 shows an example wherein the setting bar code is implemented as one bar code. As shown in the figure, if all setup items are contained in one bar code, the total number of bar codes, the serial number, and the check code are added, so that when the setting bar code is read, it can be checked to ensure that the number of bar codes is one. However, as an alternative embodiment, if all setup items can be contained in one bar code, it is also possible that the total number of bar codes, the serial number, and the check code are not added. In this case, in FIG. 5, the process proceeds to S8a from S7 and then skips S9 and jumps to the end. The bar code reader reading the setting bar code determines that the number of the setting bar codes is one by the fact that the total number of bar codes, the serial number, and the check code are not added. Thus, if the number of the bar codes is one, the total number of bar codes, the serial number, and the check code are not added, whereby the effective number of characters of the bar code can be increased accordingly and the bar code can be used efficiently.

FIG. 7 shows an example wherein the setting bar code is divided into two bar codes. In this example, the same check code and the same total number of bar codes are added to the bar codes No. 1 and No. 2 and further the different serial numbers are added.

As described above, using the software of the embodiment, the user specifies various settings concerning the bar code reader as desired and prints a specific one of the setting groups as the setting bar code, so that even a plurality of setup items can be set in batch. The need for finding out and scanning over the dedicated setting bar code for each setup item as in the related art is eliminated and a plurality of setting bar codes making up the setting group can be printed at a time for setting in a stroke, so that an ease-of-use environment can be provided for the user. Further, only setup items having values changed from the initial values are added to the bar code, so that the information amount can be decreased and the character strings to be encoded into the bar code can be shortened. Thus, work is made efficient because of a decrease in the number of scan times and the length of the data to be scanned is physically shortened, thereby decreasing imponderables, also leading to preventing a read error from occurring. Further, if it is necessary to change to a plurality of setting groups different in setup contents, a setting bar code is provided for each setting group and is scanned, whereby it is made possible to easily change to an environment in which various setup items differ. In this case, as described later, if a plurality of setting bar codes are mixed for each setting group, a check function checks that the setting bar codes belong to the same setting group, so that erroneous setting can be prevented.

Further, the software can also comprise a function of specifying various settings concerning the bar code reader connected to the computer in which the software is installed and directly changing the settings concerning the bar code reader by data communications.

[Decode Method]

Next, the operation of scanning over and decoding the printed setting bar codes will be discussed with reference to FIG. 8.

At S'1, the first setting bar code is scanned. At this time, the total number of bar codes is known and thus a scan wait state is entered at S'2 so that as many bar codes as required are scanned. The process returns to S'1 for repeatedly scanning over all setting bar codes as many times as the total number of the bar codes or until data of all bar codes is acquired. At this stage, the total number of the setting bar codes belonging to the same setting group is checked and thus shortage or excess of the number of bar codes can be prevented. To scan over a plurality of setting bar codes, they need not necessarily be scanned in order. If the read order is not correct, the setting bar codes are sorted later in the correct order.

If it is determined that all bar codes are complete, the process proceeds to S'3 and the bar code data scan result is checked for validity. Specifically, checking is performed to ensure that the bar codes have the same check code and all bar codes belonging to the same setting group have been scanned normally. If an error is found from the check code, the process is terminated at the point in time.

If it is determined that the scan result is normal, the process proceeds to S'4 and the bar codes are sorted in the serial number order. At this point in time, the setting bar codes are sorted in the correct order if they are scanned at random. Further, the process proceeds to S'5 and the total number of bar codes, the serial number, and the check code are removed from each bar code and a sequence of the data sorted is combined into the original character strings of the bar code original data.

At S'6, reading the ID number is started at the character string top. The start ID should exist at the top of the character strings and thus whether or not the first ID number is the start ID is checked at S'7. If the first ID number is not the start ID or the start ID is not found, the process is terminated.

If the start ID is found at the top, the process proceeds to S'8 and whether or not the ID number read this time is the end ID is determined. If the ID number is not the end ID, the process proceeds to S'9 and further whether or not the ID number is the save ID is determined. If the ID number is not the save ID, the process proceeds to S'10 and the parameter corresponding to the ID number is read and checking is performed to ensure that the parameter is normal. Since the value that can be set is determined in response to each setup item, checking is performed to ensure that the value read as the parameter is within the stipulated range for the setup range. If the value is abnormal, the process is terminated as NG. If the value is determined to be normal, the process proceeds to S'10a and the specified ID number and parameter are set as temporary setting. The contents of the temporary setting are written into the bar code reader as the real setting after completion of setting for each ID.

To check another setup item, the process proceeds to the next step, namely, S'11. At S'11, the ID number recorded at the following stage is read and the process jumps to S'8. Likewise, whether or not the ID number is the end ID is determined and further whether or not the ID number is the save ID is determined. After this, the operation is repeated in a similar manner until the end ID is encountered.

On the other hand, if it is determined at S'9 that the read ID number is the save ID, the process jumps to S'9a and the save flag is set to ON. Accordingly, the setup contents are saved in the EEPROM of the nonvolatile memory at S'14 described later. Since a specific parameter is not set in the save ID, the process skips S'10 (checking the parameter range) and proceeds to S'11. The save ID is thus set before the end ID, whereby the setup contents are retained, so that when the power of the bar code reader is turned off and again turned on, the updated setup contents are maintained. In contrast, if the save ID is not added, the setting change is maintained only during the power on.

Further, on the other hand, if it is determined at S'8 that the read ID number is the end ID, the process jumps to S'12. At S'12, as for the remaining ID numbers not read at this stage, the parameters of the default values (initial values) set in the ID numbers are read, so that for the setup items with the initial values intact, the need for setting the corresponding ID numbers and parameters can be eliminated for lessening the number of data pieces to be set. For example, if the setting bar code containing only the start ID and the end ID without setting specific parameters is scanned, the default values are loaded into all setup items as the factory-shipped initial state.

The process proceeds to S'13 and the temporary setting made so far is adopted as real setting. Next, the process proceeds to S'14 and whether or not the save flag is set to ON is checked. If the save flag is set to ON, the process proceeds to S'15 and all settings are saved in the EEPROM. If the save flag is OFF, the process is terminated without saving any setting.

When scanning is performed and setting change is normally made, the user can be informed of the fact and acknowledge it. For example, the bar code reader is provided with an LED display section or a loudspeaker and the light emission color, a blinking pattern, sound, etc., is changed in response to the normal or abnormal end of scanning, whereby the user is notified of the read state visually or auditorily.

If some error such as detecting unexpected data occurs in the process, the work is terminated at the point in time for preventing erroneous setting considering that imponderables are comparatively large in the operation of bar code scanning.

In the embodiment, the bar code reader comprises memory means for retaining setting. Specifically, EEPROM, etc., which is rewritable and retains the contents with the power off is used. Since the setup contents are saved in the EEPROM, the bar code reader operates according to the setup contents until the setup contents are changed.

To print the setting bar code using the embodiment, a printer connected to the computer in which the program is installed becomes necessary. However, the bar code reader needs not always be connected to a personal computer comprising a printer and a bar code printed with one computer can be used with the compatible bar code reader.

Of course, the personal computer to which the bar code reader is connected would be able to conduct data communication with the connected bar code reader, so that the user can enjoy acquiring status information of the bar code reader, changing various settings on the screen of the computer, etc.

In the embodiment, the default values are loaded into setup items not specified in the setting bar code. Thus, to change setting, the same setting needs to be maintained in each item changed from the default value at the previous setting time and to be maintained as the update. However, if the program is set so as to store the previous setup contents and automatically restore the previous setup contents when the program is next started, the user need not care which setup item was changed from the default value in the previous setting. The setup contents are saved with a name, whereby any desired setting can be called. Alternatively, when the program is started, automatically the previous setup contents may be cleared for temporarily setting all setup values to the default values. In this case, the user need not again set any item to be restored to the default value and it is determined that the default value is set as no change is made.

As another embodiment of the invention, a method of generating only parts changed from the current setup values as a setting bar code is also possible. In this method, the user may create the setting bar code only for any desired parts to be changed from the current setting, so that the bar code reader need not check the default values. In this case, each item not specified in the setting bar code inherits the current setting intact. In the method, however, combination when changing from a specific setting group to another setting group introduces a problem. That is, the setting group describing the update parts is used predicated on the previous setup contents and thus whenever the setting bar code is scanned, a check needs to be made to see if the current setting matches the base setting of the setting bar code.

The setting bar code of an optical information reader, the setting bar code generation method, the setting change method of an optical information reader, and the computer-readable medium including the setting bar code generation program according to the invention have the advantages that they make it possible to simplify the work of the user for changing to any desired setting, decrease operation mistakes, and enhance the reliability of scanning, because the invention makes it possible to generate a dedicated setting bar code wherein a plurality of setup items specified by the user are collected and moreover compress the data for decreasing the number of bar codes. The method eliminates the need for finding out and scanning over the dedicated setting bar code for each setup item as in the related art. A bar code wherein user-desired settings are collected can be created as desired and the setting bar code is scanned in a general way, whereby a plurality of settings can be changed in batch, so that an extremely ease-of-use environment can be provided for the user. Further, only setup items in which change is made are encoded, so that as the information amount can be lessened, the number of bar codes can be decreased or the total data length can be shortened accordingly. This leads to a decrease in the number of scan times and shortening the length of the data to be scanned, so that read processing can be speeded up and mechanical read errors, etc., can be reduced. Further, if a plurality of setting bar codes exist, check information is added to the setting bar codes, whereby the user need not care the scanning order and can also check whether or not the setting bar codes are valid. Thus, a human scanning mistake of the user mistaking one bar code for another can also be prevented. Thus, the invention can provide excellent advantages of saving the labor of changing the setting of an optical information reader, speeding up the operation, decreasing mistakes, and enhancing the efficiency.

What is claimed is:

1. A method for generating a setting bar code which is scanned by an optical information reader so that setup contents of a plurality of setup items concerning operation of the optical information reader are changeable, said method comprising:

changing an initial value of the setup contents to a change value indicating a desired setup content for desired setup items in the plurality of setup items;

extracting a parameter indicating the changed setup content for the setup items, each having the changed setup content in all setup items and specifying setup items having unchanged setup content, which is the same as the initial value of the setup content;

generating a bar code original data by combining parameters of the setup items each having the setup content changed from the initial value of the setup content;

dividing the bar code original data into a plurality of data parts, thereby forming a plurality of bar code parts so that a length of each of the plurality of bar code parts becomes equal or less than a predetermined length, if the length of the setting bar code generated based on the bar code original data exceeds a predetermined value;

adding read start information and read end information to the bar code original data; and outputting a setting bar code based on the bar code original data.

2. The method for generating the setting bar code as claimed in claim 1, further comprising:

adding information concerning the total number of bar code parts and the serial number relative to the total number of bar code parts to each of the plurality of data parts into which the bar code original data is divided.

3. The method for generating the setting bar code as claimed in claim 2, further comprising:

adding check information indicating that the plurality of data parts into which the bar code original data is divided belong to a same bar code original data to each of the plurality of data parts.

4. The method for generating the setting bar code as claimed in claim 1, wherein the bar code original data is generated by combining the parameters of the setup items each having the setup content changed from the initial value, and information specifying the setup items having the unchanged setup content which is the same as the initial value.

5. The method for generating the setting bar code as claimed in claim 1, wherein the bar code original data is generated by combining the setup items having the setup content changed from the initial value, and the parameter indicating the changed setup content.

6. The method for generating the setting bar code as claimed in claim 5, wherein changing the setup items and the setup content of the setup items include changing the parameters stored as the initial value to parameters indicating the change value.

7. The method for generating the setting bar code as claimed in claim 1, wherein the plurality of setup items includes at least two setup items from setting of a bar code to be read, specifying the number of characters of a bar code to be read, setting an operation mode of said optical information reader, and assigning specific functions to a switch provided in said optical information reader.

8. The method for generating the setting bar code as claimed in claim 1, further comprising applying an individual ID number to each of the setup items, wherein the setup content provided in each setup item is set as a parameter.

9. The method for generating the setting bar code as claimed in claim 1, further comprising changing setup items, at least two times, from a previously set setup content, the initial value of the setup content is changed to the change value indicating the desired setup content for the desired setup items in the plurality of setup items.

10. The method for generating the setting bar code as claimed in claim 1, wherein the predetermined value which is used in determining whether the length of the bar code original data is set to be within the maximum read range of the optical information reader.

11. A method for changing setting of an optical information reader using a setting bar code of the optical information reader which is scanned by an optical information reader so that desired setup items concerning operation of the optical information reader are changeable, said method comprising:

changing an initial value of a setup content to a change value indicating a desired setup content for the desired setup items in a plurality of setup items;

generating a bar code original data by extracting the difference between the initial value and the change value of the setup content from the setup items having the setup content changed from the initial value; and dividing the bar code original data into a plurality of data parts, thereby forming a plurality of bar code parts so that a length of each of the plurality of bar code parts becomes equal or less than a predetermined length, if the length of the setting bar code generated based on the bar code original data exceeds a predetermined value;

adding read start information and read end information to the bar code original data;

generating a setting bar code based on the bar code original data;

scanning the setting bar code for reading information;

reconstructing the read information and changing each specified setup item with the setup value; and loading the initial values into the setup items which are not specified.

12. The method for changing setting of an optical information reader as claimed in claim 11, further comprising:
adding information concerning the total number of bar code parts and the serial number relative to the total number of bar code parts to each of the plurality of data parts into which the bar code original data is divided.

13. The method for changing setting of an optical information as claimed in claim 11, further comprising:
adding check information indicating that the plurality of data parts into which the bar code original data is divided belong to a same bar code original data to each of the plurality of data parts.

14. The method for changing the setting of an optical information reader as claimed in claim 11, wherein the bar code original data is generated by combining the parameters of the setup items each having the setup content changed from the initial value, and information specifying the setup items having the unchanged setup content, which is the same as the initial value.

15. The method for changing the setting of an optical information reader as claimed in claim 11, wherein the bar code original data is generated by combining the setup items having the setup content changed from the initial value, and a parameter indicating the changed setup content.

16. The method for changing the setting of an optical information reader as claimed in claim 15, wherein changing the setup items and the setup content of the setup items include changing the parameter stored as an initial value to the parameter indicating a change value.

17. The method for changing the setting of an optical information reader as claimed in claim 11, wherein the plurality of setup items includes at least two setup items from selling of a bar code to be read, specifying the number of characters of a bar code to be read, setting an operation mode of said optical information reader, and assigning specific functions to a switch provided in said optical information reader.

18. The method for changing the setting of an optical information reader as claimed in claimed 11, further comprising applying an individual ID number to each of the setup items, and the setup content provided in each setup item is set as a parameter.

19. The method for changing the setting of an optical information reader as claimed in claim 11, further comprising changing setup items, at least two times, from a previously set setup content, the initial value of the setup content is changed to the change value indicating the desired setup content for the desired setup items in the plurality of setup items.

20. The method for changing the setting of an optical information reader as claimed in claim 11, wherein the predetermined value which is used in determining whether the length of the bar code original data is set to be within the maximum read range of the optical information reader.

21. A computer-readable medium including a program executable on a computer for generating a setting bar code for an optical information reader which is scanned by an optical information reader so that desired setup items concerning operation of the optical information reader are changeable, said program comprising instructions having:
a first function of specifying the setup items, from a plurality of setup items, each having a setup content, which is changed from an initial value to a change value indicating the desired setup content, by an operator, and further specifying the setup content of specified setup items;
a second function of determining whether or not a length of a data for each setup item specified by the first function exceeds a predetermined length;
a third function of dividing the data for the setup item into a plurality of data pieces so that a length of each of the plurality of data pieces becomes equal to or less than the predetermined length, if the second function determines that the data length of the setup item exceeds the predetermined length; and
a fourth function of generating the setting bar code including a plurality of bar code parts based on the plurality of data pieces.

22. The computer-readable medium as claimed in claim 21, wherein said program further comprises instructions having:
a fifth function of providing the number of divisions and division order data to the plurality of data pieces.

23. The computer-readable medium as claimed in claim 22, wherein the fifth function further includes instructions to add check data indicating that the plurality of data pieces into which the setup item data is divided belong to a same setup item data to each of the plurality of data pieces.

24. The computer-readable medium as claimed in claim 21, further comprising a bar code original data, wherein the bar code original data is generated by combining the parameters of the setup items each having the setup content changed from the initial value, and information specifying the setup items having an unchanged setup content, which is the same as the initial value.

25. The computer-readable medium as claimed in claim 21, further comprising a bar code original data, wherein the bar code original data is generated by combining the setup items having the setup content changed for the initial value, and a parameter indicating the changed setup content.

26. The computer-readable medium as claimed in claim 21, wherein the plurality of setup items includes at least two setup items from setting of a bar code to be read, specifying the number of characters of a bar code to be read, setting an operation mode of said optical information reader, and assigning specific functions to a switch provided in said optical information reader.

27. The computer-readable medium as claimed in claim 21, further comprising changing the setup items, at least two times, from the previously set setup content, the initial value of the setup content is changed to the change value indicating the desired setup content for the desired setup items in the plurality of setup items.

* * * * *

UNITED STATES PATENT AND TRADEMARK OFFICE
CERTIFICATE OF CORRECTION

PATENT NO. : 6,902,114 B2
DATED : June 7, 2005
INVENTOR(S) : Hashimoto et al.

It is certified that error appears in the above-identified patent and that said Letters Patent is hereby corrected as shown below:

Column 15,
Line 35, "selling" should read -- setting --.

Signed and Sealed this

Nineteenth Day of July, 2005

JON W. DUDAS
*Director of the United States Patent and Trademark Office*